H. POSER.
CASH REGISTER.
APPLICATION FILED OCT. 1, 1909.
988,383.
Patented Apr. 4, 1911.
2 SHEETS—SHEET 1.
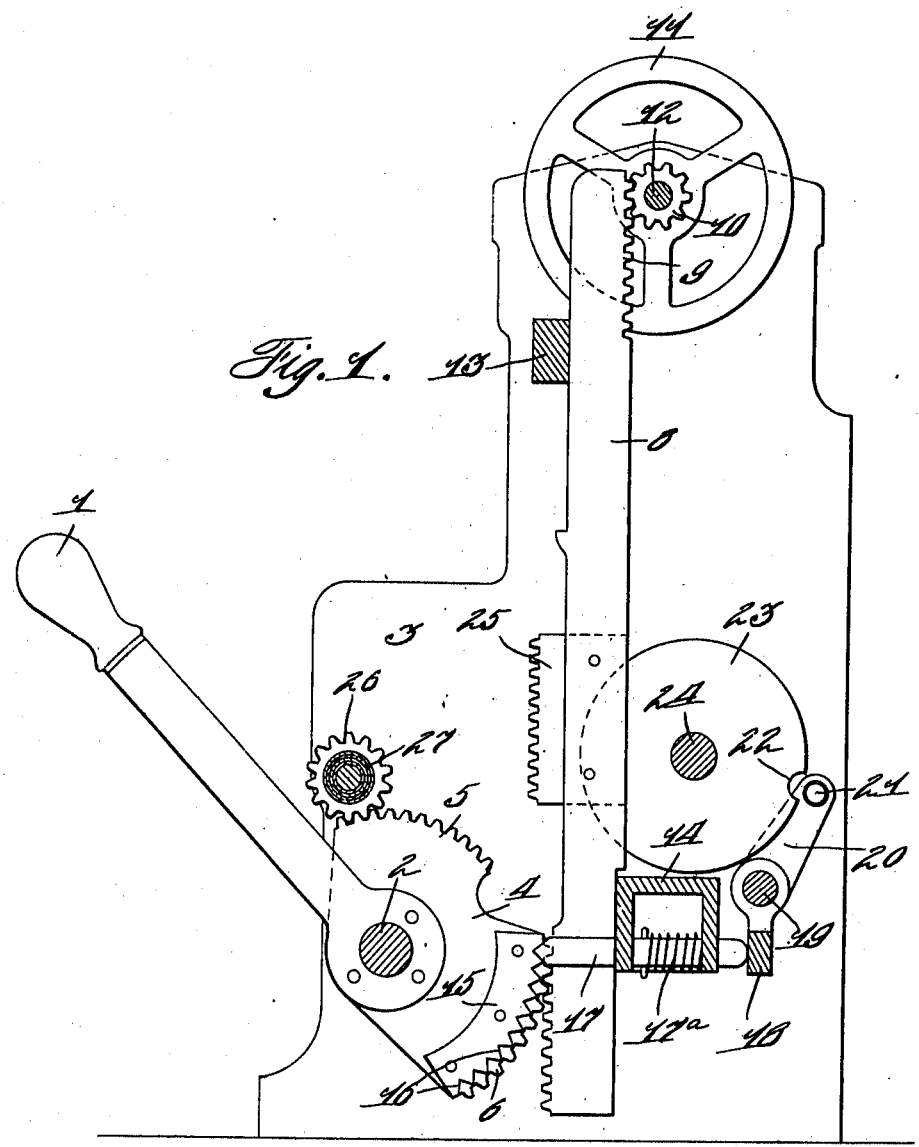

H. POSER.
CASH REGISTER.
APPLICATION FILED OCT. 1, 1909.
988,383.
Patented Apr. 4, 1911.
2 SHEETS—SHEET 2.
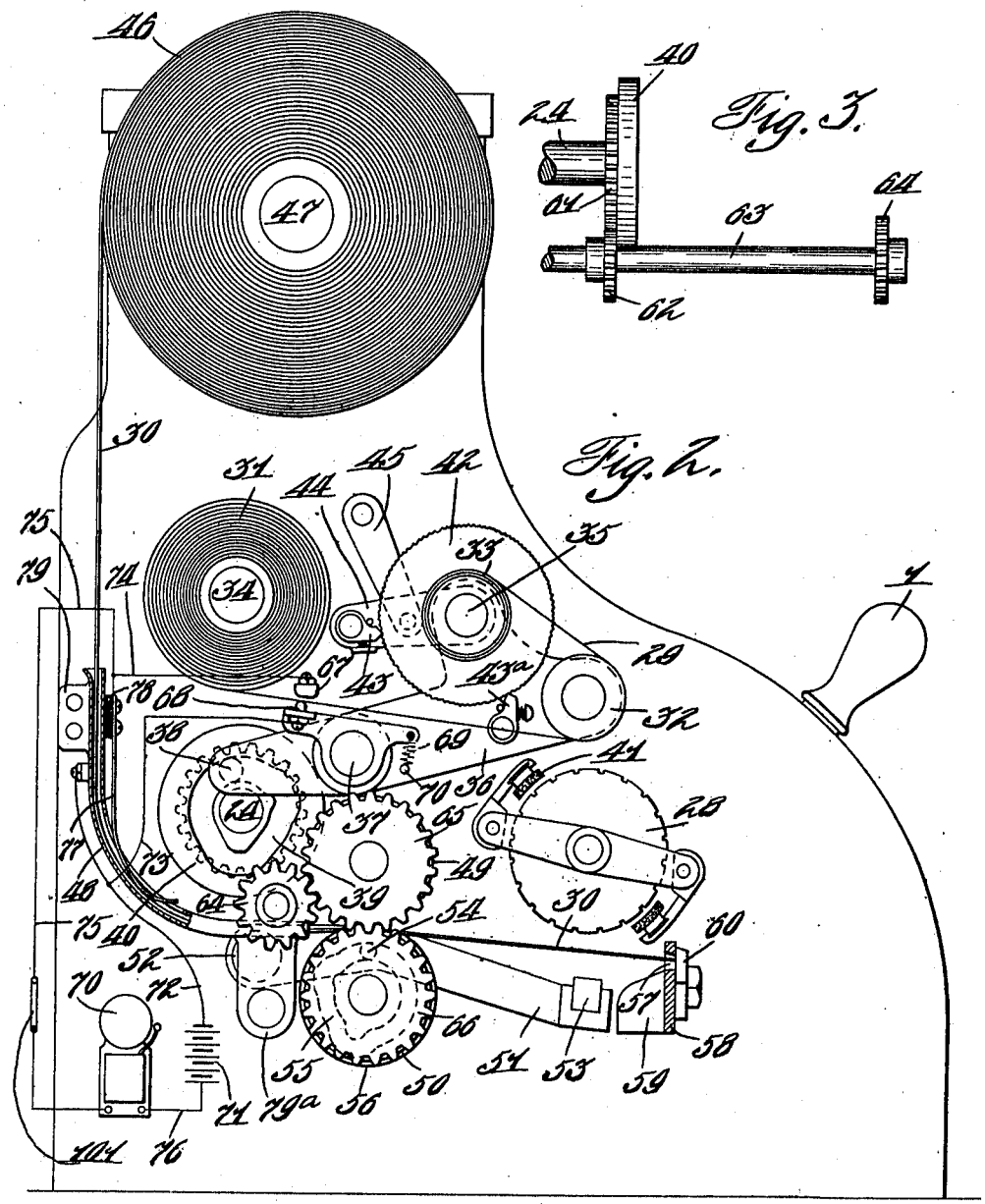

UNITED STATES PATENT OFFICE.

HERMANN POSER, OF DRESDEN-LÖBTAU, GERMANY, ASSIGNOR TO THE NATIONAL CASH REGISTER COMPANY, OF DAYTON, OHIO, A CORPORATION OF OHIO, (INCORPORATED IN 1906.)

CASH-REGISTER.

988,383.   Specification of Letters Patent.   Patented Apr. 4, 1911.

Application filed October 1, 1909. Serial No. 520,435.

*To all whom it may concern:*

Be it known that I, HERMANN POSER, a subject of the King of Saxony, residing at Dresden - Löbtau, Germany, have invented certain new and useful Improvements in Cash-Registers, of which I declare the following to be a full, clear, and exact description.

This improvement relates to cash register or analogous machines and more particularly to the recording mechanism for same.

The principal object of this invention is to provide signaling mechanism to indicate when the sales strip or the check strip is broken or nearly exhausted so that they may be replaced by new strips and thereby to avoid the danger of entries being registered in the machine without recording same upon either or both of the strips.

With this and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings: Figure 1 is a transverse sectional view through the type of machine shown in the patent to Thomas Carroll granted February 9, 1904, No. 751,611. Fig. 2 is an end elevation of the machine shown in Fig. 1 illustrating the recording mechanism with this invention applied thereto. Fig. 3 is a detail rear elevation of a part of the gearing employed in the recording mechanism.

As is well known in the art cash registers are equipped with attachments for recording upon a sales strip and a check strip the items as they are entered upon the registering mechanism of the machine. The check strip is arranged to be severed into checks which are handed to the customers as receipts for their purchases while the sales strip is automatically wound up within the machine to be referred to by the proprietor whenever desired. To be of the greatest protection it is evidently essential that all the amounts entered upon the registering mechanism should also be entered upon the sales and check strips of the recording mechanism, Cash registers as placed upon the market are usually equipped with detachable or hinged hoods for the above described recording mechanism so as to prevent the accumulation of dust and dirt in said mechanism. These hoods must be constructed so as to be capable of being readily detached or opened to enable the placing of new check and sales strip rolls or the inking of the pads or ribbon for the type carriers. These hoods for the recording mechanism, unless a careful watch is kept of the diminishing check and sales strip rolls, prevent the possibility of knowing when a new check or sales strip roll is required with the consequence that the machine is frequently operated without the presence of either strip to receive the impression from the type carriers.

Referring to Fig. 1, a brief description of the machine to which this invention is applied will be given. The setting lever 1, of which there are as many as there are denominations to be registered, is pivotally mounted upon a transverse shaft 2 secured within the side frames 3 of the machine. This lever is fastened to a plate 4 also mounted upon said shaft which is provided at its upper and rear ends with segmental racks 5 and 6 respectively. The rack 6 meshes with teeth 7 cut in the lower end of a bar 8 which is also provided with teeth 9 upon its rear upper end. The latter teeth mesh with a pinion 10 secured to an indicator 11 loosely mounted upon a transverse shaft 12, the latter being supported by the side frames 3. The rack bar 8 is suitably guided by transverse bars 13 and 14 mounted within the side frames 3.

It is to be understood that the outer end of the setting lever 1 extends through a slot formed in the cabinet (not shown) of the machine and is provided with a pointer which plays over an index plate secured to said cabinet adjacent to said slot, all of which is fully shown and described in the patent to Carroll previously mentioned. From this it will be seen that the movement of the lever 1 will be imparted to the indicator 11 to display an amount corresponding to the amount opposite the lever upon the cabinet.

Attached to the plate 4 at its rear end is a segmental plate 15 provided with V shaped notches 16 into which the forward end of a pawl 17 enters so as to aline properly the lever 1, rack 8 and indicator 11. This pawl is supported in guide 14 and is normally forced forwardly by a coil spring 17$^a$ and the rear end of said pawl contacts with a frame 18 extending down from a transverse shaft 19. This frame is provided with an upwardly extending arm 20 which is provided at its upper end with an anti-friction roller 21 arranged to enter a notch 22 in a disk 23 and thereby temporarily lock said disk whenever the pawl 17 is forced rearwardly by the movement of the lever 1. This disk 23 is secured to a shaft 24 which is rotated in any suitable manner once during each operation of the machine. As this disk is rotated its periphery will contact with the roller 21 thereby preventing the movement of the frame 18 and consequently of the setting lever 1 during the movement of said disk. As before stated there are as many levers 1 as there are denominations to be registered and connected to each lever is a rack bar which in turn is connected with an indicator. The rack bars 8 at approximately their centers, have attached thereto rack plates 25 with which pinions of a reciprocating registering mechanism (not shown) are arranged to engage as fully shown and described in the patent to Carroll previously mentioned.

The segmental rack 5 of each plate 4 meshes with a pinion 26 secured to the inner end of one of a series of nested sleeves 27. The outer end of each sleeve 27 is provided with a type carrier or wheel 28. (See Fig. 2). It will be seen from this description that as the setting lever 1 is adjusted the indicator 11 and type carrier 28 will be adjusted correspondingly. Each type wheel 28 is provided with a double series of type so as to print from opposite sides upon a sales strip 29 and a check strip 30. Both of these strips may be considered record strips, one to be tendered to the customer in the form of detached checks and the other stored in the machine for the use of the proprietor. The sales strip 29 is led from a supply roll 31 around a platen 32 to a storage roll 33. A stud 34 projecting from one of the side frames of the machine supports the supply roll 32 while the storage roll 33 is supported upon a stud 35 projecting from an upward extension of a lever 36 pivoted upon the side frame as at 37. The forward end of the lever 36 carries the platen 32, while the extreme rear end of the lever is provided with a pin 38 which plays in a cam groove 39 formed in a disk 40 secured to the outer end of the shaft 24. The configuration of the cam groove 39 is such that at each complete rotation of the shaft 24 the forward end of the lever 36 carrying the platen 32 will be rocked downwardly twice; the first time to force a pad 41, which has previously been brought beneath the platen 32 by mechanism well known in the art, into engagement with the type wheels 28 to ink same and the second time to take an impression upon the strip 29 from the inked type. The storage roll 33 is provided with a ratchet wheel 42 with which a spring pressed driving pawl 43 mounted upon the free end of an arm 44 engages. The other end of the arm 44 is pivoted about the supporting stud 35 of the storage roll 32. To the frame work of the machine is pivoted one end of a link 45 the other end of said link being pivoted to the arm 44. It will be seen from this that as the front end of the platen lever 36 is lowered the driving pawl 43 will be idly drawn over the ratchet 42 and as the platen lever is returned to normal position the pawl 43 will rotate the ratchet wheel 42 and the storage roll 33 thereby feeding the sales strip 29. A spring pressed retaining pawl 43$^a$ mounted upon the lever 36 engages the ratchet wheel 42 and holds same in its advanced position.

The check strip 30 is led from a supply roll 46 mounted upon a stud 47 projecting from the side frame of the machine through a chute 48, between feed rollers 49 and 50 thence under the type wheels 28. A lever 51 is pivoted at its rear end as at 52 to the frame of the machine and at its forward end carries a platen 53. This platen lever is provided with a pin 54 which projects into a cam groove 55 formed in a disk 56 secured to the feed roller 50. The groove 55 is shaped similarly to the groove 39 so as to reciprocate the platen lever 51 twice during each operation of the machine; the first time being to ink the type wheels and the second reciprocation to take an impression upon the check strip 30. The rollers 49 and 50 are so shaped that the strip 30 is not fed while the platen lever 51 is being reciprocated. The check strip 30 is led from under the type wheels 28 through an opening 57 in a plate 58 suitably secured to a projection 59 extending from the side frame. The upper edge of this opening is ground to form a knife with which a movable blade 60 coöperates to sever the strip 30 into checks during the final movement of each operation of the machine, as fully described in the above mentioned Carroll patent.

The feed rollers 49 and 50 are rotated at each operation of the machine in the following described manner: Secured to the inside of the cam disk 40 is a gear 61, which meshes with a pinion 62, (see Fig. 3) fast to the inner end of a short transverse shaft 63, to the outer end of which is secured a similar pinion 64. This pinion 64 meshes with a gear wheel 65 secured to the feed roller 49, the latter in turn meshing with a gear wheel 66 fastened to the feed roller 50.

The description as thus far given is that of the machine of the patent referred to, and the parts described are not a part of the present invention.

The sales strip 29 as it is led from the supply roll 31 to the storage roll passes between contacts 67 and 68. The contact 68 is pivotally mounted upon the stud 37 which also acts as the fulcrum for the platen lever 36 and is normally held in contact with the sales strip 29 by a light spring 69, the ends of which are fastened to one end of the contact 68 and to a pin 70 projecting from the lever 36. As the size of the roll 31 decreases the strip 29 is guided by the contact 67 which projects from the side frame and when the strip is entirely fed from the roll 31 past the contact 67, the latter will be engaged by the contact 68 and thereby close an electrical circuit through a signal, such as a bell 70 suitably located at the machine, as follows: From a battery 71, wires 72 and 73, contacts 68 and 67, wires 74 and 75 to the bell 70 and then through a wire 76 back to the battery 71. As previously described the check strip 30 passes through the chute 48 and as long as the said strip passes through the chute a spring contact 77 mounted upon the chute but insulated therefrom as at 78 is held out of contact with the chute thereby keeping a circuit through the alarm 70 open. When the last part of the check strip passes through the chute, the contact 70 which passes through an opening in said chute and is normally held from engagement with the chute by the strip, springs into engagement with the chute and forms the following circuit through the alarm: From battery 71, wire 72, chute 48, contact 77, wire 75, bell 70, wire 76 back to the battery 71.

The chute 48 is made of brass or some other suitable conducting material and is supported by tabs 79 and 79ª projecting therefrom and appropriately connected to the side frame.

It will be seen from the above description and by reference to the drawings that the circuits embodying the contacts 67 and 68 and the contact 77 with the chute 48 are made before the strips pass the type carriers and consequently the alarm will be sounded before the strips are completely exhausted from the machine although the supply rolls 31 and 46 are exhausted. The alarm will be sounded as the broken end of the strip is drawn past the contacts held apart thereby.

To permit insertion of new strips without sounding the signal, a hand operated switch 101 may be placed at any desired point in the circuit. When this switch is opened the signal is inoperative whether the strips are in place or not.

It is to be understood that while this invention has been shown applied to the type of machine illustrated in the previously mentioned Carroll patent, it is not to be limited to this particular type of machine as it may with equal facility be applied to any other form of machine employing a recording mechanism.

What is claimed is as follows:

1. In a cash register, the combination with a recording mechanism including a plurality of record strips, of means for feeding said strips, and an electrical signal controlled by either of said strips.

2. In a cash register, the combination with a recording mechanism including a plurality of record strips and means for feeding said strips, an electrical alarm actuated upon the exhaustion of either of said strips.

3. In a cash register, the combination with a recording mechanism including a plurality of record strips, independent feeding devices for each strip, and a signal actuated upon the exhaustion of either of said strips.

4. In a cash register, the combination with a recording mechanism including a plurality of record strips, of independent feeding devices for each strip, and an alarm actuated upon the exhaustion of either of said strips.

5. In a cash register, the combination with a recording mechanism including a sales strip and a check strip, of independent feeding devices for said strips, an electrically operated signal, a plurality of normally open circuits therefor, and contacts for closing said circuits, the said contacts being controlled by the strips.

6. In a cash register, the combination with a recording mechanism including a sales strip and a check strip, and independent feeding devices for said strips; of an electrically operated alarm, a plurality of normally open circuits therefor, and means controlled by the exhaustion of either of said strips for closing one of the circuits and thereby sounding the alarm.

7. In a cash register, the combination with a recording mechanism including a check strip, of feeding devices for said strip, a chute through which said strip is fed, an electrically controlled signal, a normally open circuit therefor, a contact constructed to engage the chute and close said circuit to operate the signal upon the exhaustion of said strip.

8. In a cash register, the combination with a recording mechanism including a plurality of record strips, of independent feeding devices therefor, an electrically controlled signal for indicating the exhaustion of either of said strips, a plurality of circuits therefor, and a plurality of contacts for each circuit which are normally held separated by the strips passing between same.

In testimony whereof I affix my signature in the presence of two witnesses.

HERMANN POSER.

Witnesses:
 PAUL ARRAS,
 CLÄRE SIMON.

Copies of this patent may be obtained for five cents each, by addressing the "Commissioner of Patents, Washington, D. C."